Patented Oct. 3, 1922.

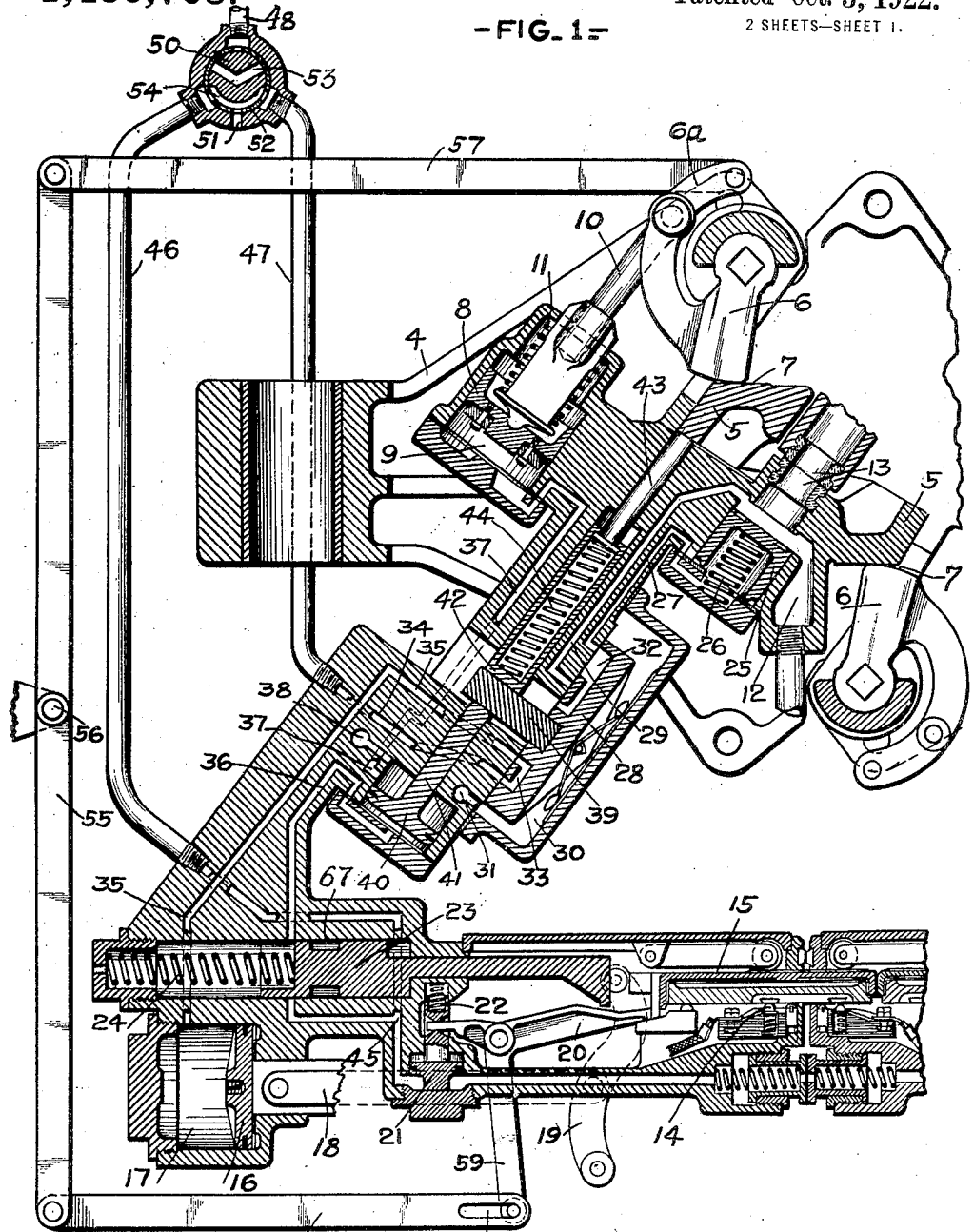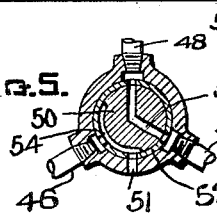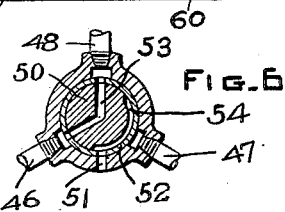

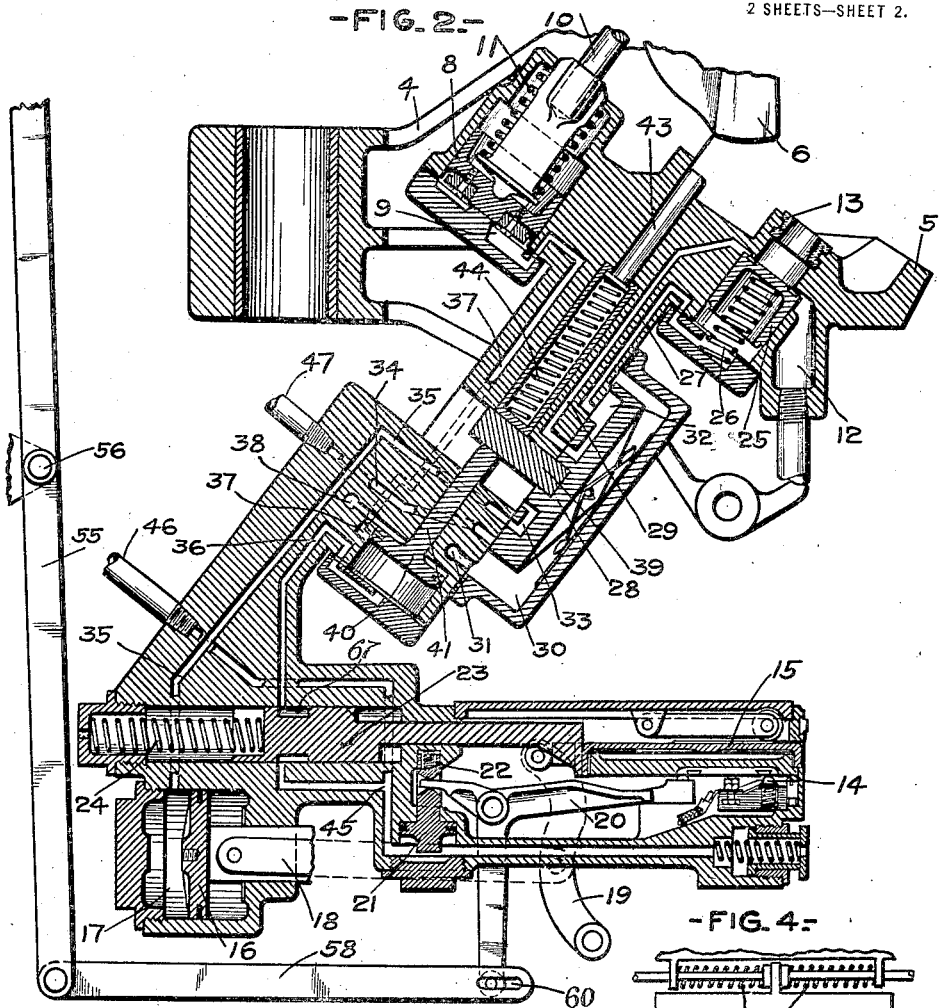

1,430,703

UNITED STATES PATENT OFFICE.

WALTER V. TURNER, DECEASED, LATE OF WILKINSBURG, PENNSYLVANIA, BY SAMUEL C. McCONAHEY, ADMINISTRATOR, OF EDGEWOOD, PENNSYLVANIA, ASSIGNOR TO WESTINGHOUSE AIR BRAKE COMPANY, OF WILMERDING, PENNSYLVANIA, A CORPORATION OF PENNSYLVANIA.

AUTOMATIC CAR, TRAIN-PIPE, AND ELECTRIC COUPLING.

Application filed May 22, 1919. Serial No. 299,017.

*To all whom it may concern:*

Be it known that WALTER V. TURNER, deceased, late a citizen of the United States, and resident of Wilkinsburg, in the county of Allegheny and State of Pennsylvania, did invent a certain new and useful Improvement in Automatic Car, Train-Pipe, and Electric Couplings, of which improvement the following is a specification.

This invention relates to car couplings, and more particularly to that type of coupling in which the counterpart coupler heads are adapted to be rigidly locked together, and also provided with means for connecting the train pipe passages and the electric wire connections between the cars.

Automatic couplers of this type have heretofore been employed having pivoted latch levers for locking the counterpart coupler heads together, pistons actuated by fluid pressure for releasing the locks, automatic valve devices for controlling communication through the connected train pipe passages, and a movable slide or contact carrier adapted to be projected by fluid pressure, to establish electric connection between the corresponding circuits on the connected cars. In some of these prior constructions, there is a possibility that the coupler heads may not be fully coupled before the train pipe passage is partly opened, or before the electric contact slide is moved outward, in which case there may be a leakage or venting of air from the train brake pipe which will produce an undesired application of the brakes, and the electric contact carrier may become damaged by further lateral movement of the adjoining coupler head. It might also happen that coupled heads become unlocked for uncoupling, before the train pipe passage is fully closed and the electric contact carrier withdrawn, which might produce the same undesirable conditions with the consequent damage and delay.

The object of this invention is to overcome these objections, and it comprises an improved valve device actuated in one direction by the coming together of the counterpart coupler heads in the act of coupling, and in the other direction by a manually controlled fluid pressure piston for effecting the opening and closing of the train pipe passage, and for controlling communication from a source of fluid supply to the contact carrier operating piston and to the release piston of the coupler lock.

When the couplers are locked together with one of the contact carriers or slides extended to its coupled position, if the couplers should be accidentally pulled apart, there is danger of breakage or injury to the contact slide, particularly on account of the relative lateral movement between the coupler heads during the approach and receding movements. It is important, therefore, in case of a break-in-two, or an accidental pulling apart of the couplers, to instantly withdraw the contact slide, and one of the features of this invention comprises a connection operated by the release movement of the coupler lock for effecting a withdrawal of the extended contact slide.

In the accompanying drawings: Figure 1 is a diagrammatic sectional view, showing one form of combined car, train pipe, and electric coupler, embodying this invention, the parts being indicated in the coupled position; Fig. 2, a similar view showing the parts in uncoupled position; Fig. 3, a sectional view showing a modified form of valve device; Fig. 4, a detail view illustrating the return springs for the electric contact slide; and Figs. 5 and 6, sectional views showing the manually operated valve in different positions.

The coupler head may be of the usual rigid lock type having a casting, 4, provided with a hook-shaped projection or nose, 5, adapted to interlock by a forward and lateral movement with the corresponding projection of a counterpart coupler head, a movable latch or pivoted locking lever, 6, adapted to engage a clamping surface, 7, on the nose of the counterpart coupler, a piston, 8, mounted in cylinder, 9, and connected by a rod, 10, with the locking lever, and a spring, 11, for normally moving the latch to its locked position. The coupler head is also provided with one or more train pipe passages, 12, adapted to be connected at the face of the coupler by means of a gasket, 13, with the corresponding gasket opening in the counterpart coupler head. The electric portion which is usually attached beneath the coupler head is indicated as comprising the usual contact carrier or slide, 15, having suitable contacts for cooperating with the respective contacts, 14, of the car line circuits, piston, 16, mounted in cylinder, 17, and connected by rod, 18, and lever, 19, with the slide, 15. When the slide is extended, the trigger lever, 20, locks the same in said position, the trigger being actuated by the spring, 22, and piston, 21, in the usual way.

The train pipe passage, 12, is controlled by valve, 25, in the form of a piston mounted in a cylindrical chamber containing a spring, 26, tending to close said valve, the space behind the valve communicating by a port, 27, with the seat of slide valve, 28, and the train pipe space at the face of the valve, 25, communicating by a port, 29, with the slide valve seat. The slide valve, 28, is mounted in a chamber, 30, to which fluid under pressure may be supplied in any convenient manner, as by a passage, 31, for holding the valve upon its seat. The slide valve is provided with a port or cavity, 32, for controlling communication between ports, 27 and 29, and also with a port or cavity, 33, for controlling communication from the manual operating valve, 50, through pipe, 47, and ports, 34 and 35, to the cylinder, 17, of the slide operating piston, 16.

The slide valve, 28, is moved in one direction by the coming together of the counterpart coupler heads, the nose, 5, of one coupler engaging a stem acting on a projection, 39, from the valve. The stem is preferably formed of two sections, 42 and 43, with a spring, 44, located between them. The slide valve is operated in the other direction by the small piston, 40, and stem, 41, bearing upon the projection, 39, fluid being admitted to the face of piston, 40, by a port, 36. A port, 37, connected to the cylinder, 9, is also controlled by the movement of piston, 40. Exhaust port, 38, leads from the piston chamber to the atmosphere. A passage, 45, which is connected by pipe, 46, with the manual valve, 50, also communicates with the trigger operating piston, 21, and the corresponding passage, 45, of the counterpart coupler. A valve, 23, having a spring, 24, is adapted to be operated by the release movement of the slide, 15, to open communication from passage, 45, to passage, 36, and piston, 40.

The manual operating valve, 50, connected to pipes, 46 and 47, and also to a supply pipe, 48, is usually located in the cab at the end of the car, and may be of the usual construction, having ports, 53, and 52, and exhaust port, 51.

According to another feature of the improved construction, there is a mechanical connection between the coupler lock and the trigger lever of the contact slide, such a connection being indicated by the lever, 55, fulcrumed at 56, a rod or bar, 57, connecting one end of said lever with the projecting arm, 6ª, of coupler lock, 6, and a rod, 58, connecting the other end of said lever with the arm, 59, of the trigger lever, 20, the latter connection having a slot, 60, to allow for the free movement of the coupler lock during the usual coupling action.

The operation of the device is as follows:

When the couplers are released and separated, the parts are in the position indicated in Fig. 2 of the drawings, the train pipe valve, 25, being held closed by its spring, 26, and the fluid pressure admitted through ports 29, 32, and 27, to the space at the back of the valve. The slide, 15, is withdrawn to its neutral position, and the cylinder, 17, is open to the atmosphere through passage, 35, and port, 33, in the slide valve, 28. The other passages, 45, 36, and 37, and cylinder, 9, are also open to the atmosphere, through the open end of passage, 45, at the face of the coupler and also through the exhaust port, 51, of the manual operating valve, 50.

As the two counterpart coupler heads come together in the act of coupling, the nose, 5, of one coupler slides along the inclined face of the other coupler, depressing the pivoted coupler lock, 6, and compressing the spring, 11. This movement of the coupler lock also moves the rods, 57 and 58, and lever, 55, but as the trigger lever, 20, is already down, as shown in Fig. 2, the pin merely slides in the slot, 60, and has no effect. As the nose, 5, reaches its final coupled position, in which the locking lever, 6, is forced out by spring, 11, to engage the clamping surface, 7, for locking said coupler heads together, the stem, 43, is pushed inward, and, acting through spring, 44, and stem, 42, moves the slide valve, 28, to the position shown in Fig. 1, in which communication from port, 29, is cut off, and port, 27, is connected to the atmosphere through port, 32, in the slide valve. Fluid is thereby vented from the space back of the piston valve, 25, and the train pipe pressure acting on the face of the valve surrounding its seat, immediately forces the valve open against the spring, 26. Communication is thereby established through the train pipe passage, 12, and gaskets, 13, with the corresponding passage of the counterpart coupler. This movement of the slide valve, 28, also establishes communication between ports, 34, 33, and 35, while the movement of piston, 40, which is also pushed inwardly by its stem, 41, connects the port, 37, of cylinder, 9, to the exhaust port, 38.

The contact slide may now be extended for establishing the electrical connections, and this is done by turning the operating valve, 50, on one of the cars to its coupling position, shown in Fig. 5, in which port, 53, connects pipes, 48 and 47, and air flows through ports, 34, 33, and 35, to cylinder, 17, where it acts to force the piston, 16, and slide, 15, outward to the extended position, as shown in Fig. 1, thereby establishing electrical connections between the corresponding circuits of the counterpart couplers in the usual way. As the slide reaches its extended position, the spring, 22, acting on the trigger lever, 20, turns the same to lock the slide in said extended position. The operating valve, 50, may then be turned back to its intermediate or neutral position, and the air will be exhausted from the operating cylinder, 17, through pipe, 47, and ports, 52 and 51.

When it is desired to uncouple and separate the cars, one of the operating valves, 50, is turned to its uncoupling position, shown in Fig. 6, in which air is supplied from pipe, 48, through port, 53, to pipe, 46, and passage, 45, where it acts upon the trigger piston, 21, to trip the trigger lever, 20, and release the slide, 15. It will be understood that the air flows through the corresponding passage, 45, of the other coupler, and consequently will release either trigger that has been set. It also flows to the other operating valve which stands in its neutral position, but in this position the exhaust from pipe, 46, to port, 51, is restricted at 54, so as to permit the escape of only a small amount of fluid to the atmosphere, and not enough to interfere with the accumulation of sufficient pressure in the pipes and passages to operate the pistons of the trigger levers and the other valve devices. As the trigger lever is released, the usual centering springs 66, return the slides to neutral position, and during the latter part of this movement of the slides, the valves, 23, are moved to the position for opening communication through groove, 67, from passage, 45, to passage, 36, on both couplers, as shown in Fig. 2. Fluid then flows into the chamber of piston, 40, on both couplers and moves the slide valves back to the position shown in Fig. 2. During this movement, the sectional stem, 42, moves with the valve, and the spring, 44, will be compressed while the stem, 43, remains stationary in the position shown in Fig. 1, with its outer end engaging the nose, 5, of the other coupler. The port, 32, in the slide valve then connects ports, 29 and 27, thereby equalizing the pressure upon the back of the piston valve, 25, of the train pipe passage, whereupon the spring, 26, closes said valve. The operating cylinder, 17, is vented to the atmosphere through ports, 35, and 33, and communication is established from port, 36, to port, 37, and the lock releasing cylinder, 9, thus effecting the release of the coupler lock, so that the couplers may then be separated, and the uncoupling operation is complete. As the couplers move apart, the spring, 44, expands and moves the stem, 43, outward to its first position shown in Fig. 2. At the same time, the air from the passages is exhausted through the open end of passage, 45, at the face of the coupler, and through the operating valve, 50, which is then turned back to its neutral position.

In the modification shown in Fig. 3, the spring, 44, is eliminated, the stem, 43ª, for actuating the slide valve, 28, is formed in one integral piece, and additional ports, 63 and 64, are provided leading from the slide valve seat to the passages, 36 and 27, respectively, while the slide valve, 28, has an additional port, 65, for connecting ports, 63 and 64, in the coupled position. In this construction, the passage, 37, also communicates directly with passage, 36, instead of being controlled by the piston, 40, as the coupler locks must be released before the piston, 40, and slide valve, 28, are moved.

The operation of this modification in coupling is substantially the same as that before described, but in uncoupling, the operation is somewhat different. After the electric contact slide has been released, as before described, and air is supplied to the passage, 36, and to the piston, 40, this piston cannot move the valve, 28, until after the couplers have separated on account of the rigid stem, 43ª, bearing against the nose of the other coupler. At this time, however, the air from passage, 36, flows through ports, 63, 65, 64 and 27 to the back of the train pipe valve, 25, and effects the prompt closing of that valve even though the exhaust from the cavity, 32, of the valve is open, since this exhaust is sufficiently restricted to allow the fluid pressure to accumulate at the back of the valve, 25. At the same time, air flows through passage, 37, to the unlocking cylinder, 9, and actuates the piston, 8, to release the coupler lock, 6, and permit the separation of the couplers. As the couplers move apart, the piston, 40, moves the valve, 28, to its opposite position, in which the connection through ports, 63, 64 and 65, is cut off, the exhaust from cavity, 32, also closed, and communication opened between ports, 29 and 27, whereby pressure from the train pipe passage, 12, remains balanced upon the back of valve, 25, and holds said valve closed.

When the couplers are locked together in the running position, (Fig. 1), if for any reason the couplers should accidentally pull apart by the coupler lock riding upon the nose of the adjoining coupler, it will be seen that this movement of the coupler lock, acting through rods, 57 and 58, and lever, 55, will move the arm, 59, of trigger lever, 20, sufficiently to trip the slide, 15, and permit the same to be instantly withdrawn to its neutral position by the centering springs.

This protects the contact slide and prevents the same from becoming damaged by an accidental pulling apart of the couplers. Under these conditions, the slide valve, 28, does not move, consequently the train pipe valve, 25, will remain open to permit a venting of air from the train brake pipe, 12, through the gasket opening, and cause the automatic application of the brakes.

I claim as my invention, and desire to secure by Letters Patent:

1. In a car coupling mechanism, the combination of a coupler head having a movable lock, and a train pipe passage, a piston valve actuated by fluid pressure for controlling said passage, a movable contact carrier for coupling the electric circuits, a piston for projecting said carrier, and a valve device actuated in one direction by the coming together of the couplers in the act of coupling, and having ports for controlling the fluid pressure acting on said piston valve, and communication to the operating piston of the electric contact carrier.

2. In a car coupling mechanism, the combination of a coupler head having a movable lock, and a train pipe passage, a piston valve actuated by fluid pressure for controlling said passage, a movable contact carrier for coupling the electric circuits, a valve device for controlling the fluid pressure acting on said piston valve, and communication to the operating piston of the contact carrier, a stem adapted to be engaged by the counterpart coupler in the act of coupling for moving said valve device in one direction, and a fluid pressure actuated piston for moving the valve in the opposite direction.

3. In a car coupling mechanism, the combination of a coupler head having a movable lock, and a train pipe passage, a piston valve actuated by fluid pressure for controlling said passage, a movable contact carrier for coupling the electric circuits, a valve device for controlling the fluid pressure acting on said piston valve, means operated by the coming together of the couplers in the act of coupling for moving said valve device to one position, a fluid pressure actuated piston for moving said valve device to its opposite position, and valve means governed by the movement of the contact carrier for controlling communication to said fluid pressure actuated piston.

4. In a car coupling mechanism, the combination of a coupler head having a movable lock for holding the coupler heads together, a cylinder and piston for releasing said lock, a train pipe passage adapted to communicate with the corresponding passage in a counterpart coupler, a piston valve actuated by fluid pressure for controlling said passage, and a valve device having ports for controlling the pressure acting on said piston valve to open and close the same, and ports for controlling communication to said lock releasing cylinder, said valve device being actuated in one direction by the coming together of the couplers in coupling, and in the opposite direction by fluid pressure.

5. In a car coupling mechanism, the combination of a coupler head having a movable lock for holding the coupler heads together, a cylinder and piston for releasing said lock, a train pipe passage adapted to communicate with the corresponding passage in a counterpart coupler, a piston valve actuated by fluid pressure for controlling said passage, a valve having ports for controlling the fluid pressure acting on said piston valve to open and close the same, a stem actuated by the counterpart coupler for moving said valve to one position, a fluid pressure actuated piston for moving the valve to its opposite position, and ports controlled by the movement of said piston for opening and closing communication to said lock releasing cylinder.

6. In a car coupling mechanism, the combination of a coupler head having a movable lock for holding the coupler heads together, a cylinder and piston for releasing said lock, a train pipe passage adapted to communicate with the corresponding passage in a counterpart coupler, a piston valve actuated by fluid pressure for controlling said passage, a valve having ports for controlling the fluid pressure acting on said piston valve to open and close the same, a collapsible stem formed in sections with an intermediate spring, and actuated by the counterpart coupler to move said valve to one position, a fluid pressure actuated piston for moving said valve to its opposite position and collapsing said stem, and means governed by said movement of the fluid pressure actuated piston for opening communication to said lock releasing cylinder.

7. In a car coupling mechanism, the combination with a coupler head having a movable lock, a train pipe passage and a fluid pressure operated valve for controlling said passage, of a movable contact carrier for coupling electric circuits, a detent for holding the carrier projected, a piston for releasing the detent and a valve independent of said piston and operated by the release action of the contact carrier for controlling a supply of fluid to operate the valve of the train pipe passage.

8. In a car coupling mechanism, the combination with a coupler head having a movable lock, a train pipe passage and a fluid pressure operated valve for controlling said passage, of a movable contact carrier for coupling electric circuits, a detent for holding the carrier projected, a piston for releasing the detent and a valve independent of said piston and operated by the release action of the contact carrier for controlling a supply of fluid to operate the valve of the train pipe passage, and to release the coupler lock.

9. In a car coupling mechanism, the combination with a coupler head having a movable lock, a train pipe passage, a train pipe valve operated by fluid pressure, and a piston and valve for controlling said fluid pressure, of a movable contact carrier for coupling electric circuits, and a valve operated by the release action of the contact carrier for controlling a supply of fluid to said piston.

10. In a car coupling mechanism, the combination with a coupler head having a movable lock, a train pipe passage, a train pipe valve operated by fluid pressure, and a piston and valve for controlling said fluid pressure, of a movable contact carrier for coupling electric circuits, a piston for releasing the coupler lock, and a valve operated by the release action of the contact carrier for controlling a supply of fluid to both of said pistons.

In testimony whereof I have hereunto set my hand.

SAMUEL C. McCONAHEY,
*Administrator of the estate of Walter V. Turner, deceased.*